F. O. SWENSON & O. E. HALLEN.
COTTON CHOPPER.
APPLICATION FILED MAR. 3, 1910
995,735.
Patented June 20, 1911.
2 SHEETS—SHEET 1.
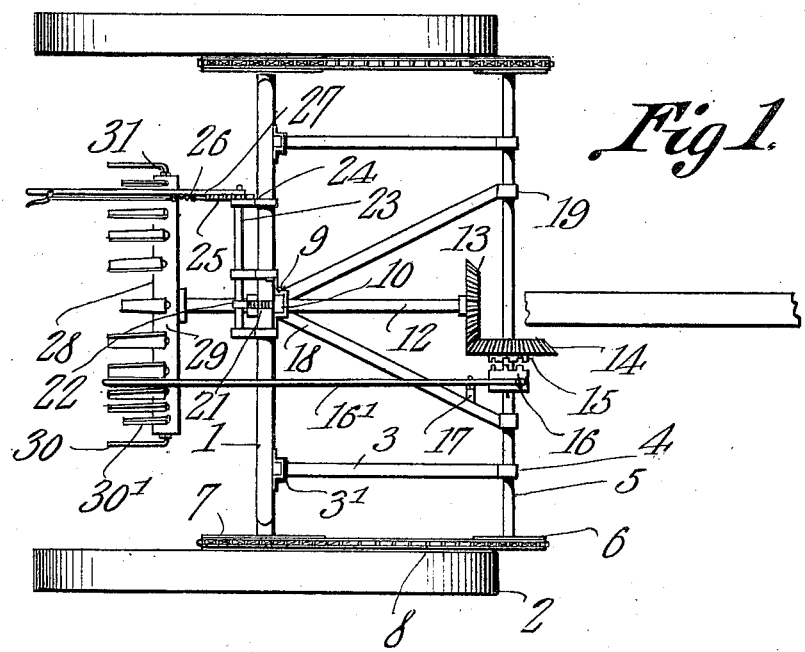
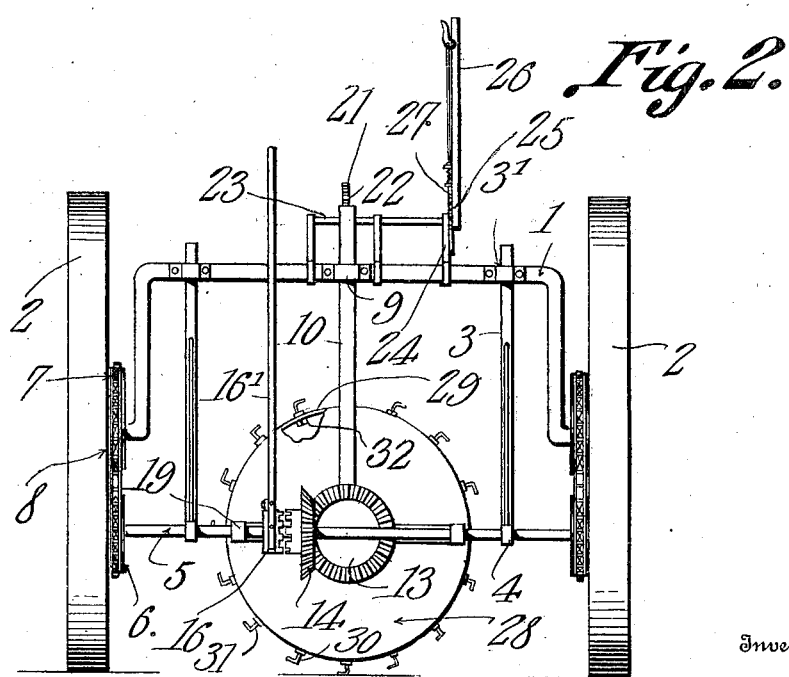

F. O. SWENSON & O. E. HALLEN.
COTTON CHOPPER.
APPLICATION FILED MAR. 3, 1910.
995,735.
Patented June 20, 1911.
2 SHEETS—SHEET 2.
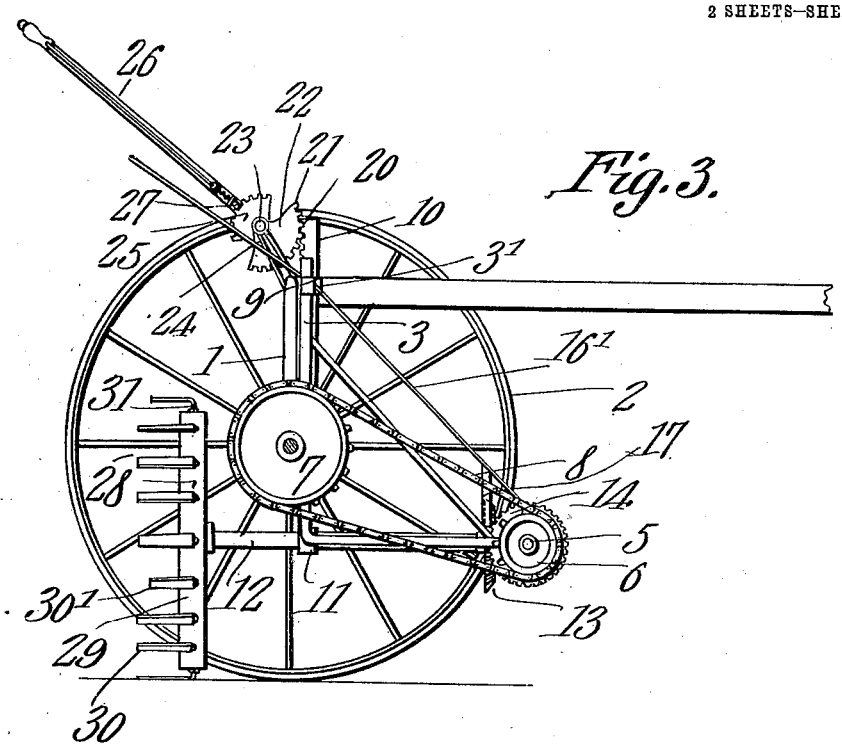
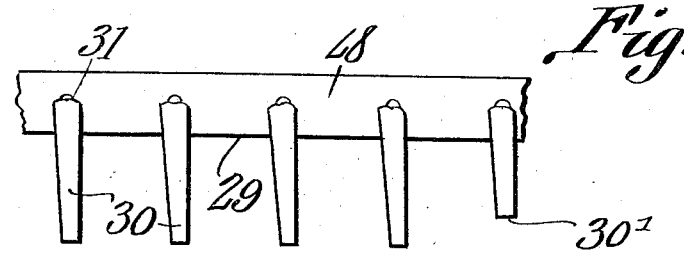

UNITED STATES PATENT OFFICE.

FRANK O. SWENSON AND OSCAR E. HALLEN, OF MOLINE, ILLINOIS.

COTTON-CHOPPER.

995,735.

Specification of Letters Patent. Patented June 20, 1911.

Application filed March 3, 1910. Serial No. 547,090.

*To all whom it may concern:*

Be it known that we, FRANK O. SWENSON and OSCAR E. HALLEN, citizens of the United States, residing at Moline, in the county of Rock Island and State of Illinois, have invented a new and useful Cotton-Chopper, of which the following is a specification.

This invention relates to a cotton chopper and it consists in the novel construction and arrangement of its parts as hereinafter shown and described.

The object of the invention is to provide a cotton chopper in the form of an attachment adapted to be applied to the arch axle and wheels of a cultivator frame and which includes a structure for operatively supporting a shaft which carries a rotor provided upon its periphery with a series of chopping blades. The blades are arranged to operate transversely of a row of standing plants and are mounted in series with one blade in each series shorter than the other blades of the same series so that as the blades traverse the row of plants the short blades will leave plants standing in the row while the longer blades will chop out the plants in the row.

In the accompanying drawing, Figure 1 is a top plan view of a cotton chopper with parts broken away. Fig. 2 is a front elevation of the same. Fig. 3 is a side elevation of the cotton chopper with one of the supporting wheels removed. Fig. 4 is a detailed diagrammatic view showing the arrangement of the blades upon the rotor of the cotton chopper.

The cotton chopper includes an arch axle 1 having the supporting wheels 2 journaled upon the ends thereof. The axle 1 is provided at its intermediate portion with guides 3' in which are slidably mounted brackets 3. The brackets 3 are provided at their lower ends with bearings 4 in which is journaled a shaft 5. Sprocket wheels 6 are fixed to the ends of the shaft 5, and sprocket rims 7 are concentrically mounted with relation to the supporting wheels 2 and arranged to rotate in unison therewith. Sprocket chains 8 pass around the sprocket wheels 6 and rims 7 and are adapted to transmit rotary movement from the wheels 2 to the shaft 5.

A guide 9 is mounted upon the intermediate portion of the arch axle 1 and a standard 10 is slidably mounted in the said guide 9. The standard 10 is provided at its lower end with a bearing 11 in which is journaled a shaft 12. The shaft 12 is disposed at a right angle to the shaft 5 and is provided at its forward ends with a beveled gear wheel 13. A beveled gear wheel 14 is loosely mounted upon the shaft 5 and meshes with the beveled gear wheel 13. The wheel 14 is provided with a clutch hub 15. A clutch member 16 is splined upon the shaft 5 and is adapted to engage the clutch hub 15 of the wheel 14. A lever 16' is operatively connected at one end with the clutch member 16 and is fulcrumed upon a standard 17 mounted upon one of the braces 18 (to be described hereinafter). It will be seen that by swinging the lever 16' the clutch member 16 may be moved into engagement with the hub 15 of the wheel 14, whereby the said wheel 14 may be caused to rotate in unison with the shaft 5 and thus rotary movement is transmitted from the shaft 5 to the shaft 12.

The braces 18 are provided at their forward ends with bearings 19 which receive the shaft 5 and the rear ends of the said braces 19 converge toward each other and join with the lower portion of the standard 10 heretofore described.

The standard 10 is provided at its upper rear edge with a series of teeth 20 which mesh with the teeth 21 of a segment 22 mounted upon a shaft 23. Brackets 24 are mounted upon the intermediate portion of the arch axle 1 and within the said brackets 24 the shaft 23 is journaled. One of the brackets 24 is provided with a tooth segment 25 and a lever 26 is fixed at one end to the shaft 23 and is located adjacent to the said segment 25. The lever 26 carries a spring actuated pawl 27 adapted to engage the teeth of the segment 25 and secure the lever 26 in an adjusted position. By this arrangement it will be seen that by swinging the lever 26 the shaft 23 will be rotated upon its axis whereby the teeth 21 of the segment 22 in engagement with the teeth 20 at the upper end of the standard 10 will move the said standard in an upward or downward direction in the guide 9 according to the direction in which the lever 26 is swung. Thus means are provided for raising and lowering the shaft 12, the shaft 5 and their attachments.

A rotor 28 is mounted upon the rear end of the shaft 12 and is provided at its periphery with an annular flange 29 which is parallel with the axis of the shaft 12. The rotor 28 is provided upon the flange 29 with a series of blades 30 which are arranged in sets each set made up of a distinct series. As illustrated in the accompanying drawing, each set is made up of a series of side blades but it is to be understood that the series or number of blades in each set may be increased or diminished as desired. Each blade 30 is provided with a shank 31 which is disposed at approximately a right angle to the chopping portion of the blade and passes transversely through the flange 29 of the rotor 28 and is supported in position by means of a nut 32 screw threaded upon the inner end of the blade and bearing against the inner side of the flange 29. All of the blades 30 of a series of blades in a set are of maximum length except a blade 30' which is also one of the component blades of the series or set of blades. The blade 30' is shorter than the other blades of the series in the set and consequently when the blades 30 chop out the superfluous plants in a row the blades 30' will also chop out some plants but will leave other plants standing uncut in the row. Consequently the blade 30' may be referred to as the blade which in part is passive upon the plants in the row while the remaining blades of the series are active upon the plants standing in the row.

It is thought unnecessary to go into further description to set forth the manner in which the rotor and the blades carried thereby will operate upon the plants and it is believed to be apparent that the arrangement of the blades may be such as to cut out the plants at intervals desired while the plants may be left standing in the row at any desired point.

It is to be understood that any suitable means may be provided for holding the lever 16' against movement after the clutch member 16 has been shifted into or out of engagement with the clutch hub 15.

Having thus described the invention what we claim as new and desire to secure by Letters-Patent is:

In combination with an arched axle and supporting wheels journaled thereon, a cotton chopper attachment including brackets slidably mounted upon the arched portion of the axle, a shaft journaled in said brackets and located in advance of the arched portion of the axle and operatively connected with the supporting wheels, a standard slidable vertically upon the axle, means for setting the standard, a shaft journaled in the lower portion of the standard and operatively connected with the first said shaft, a rotor mounted upon the last mentioned shaft and located behind the arched portion of the axle, and a series of blades mounted upon the periphery of the rotor, the parts being so arranged that the shafts retain a uniform angular relation to each other during their vertical movement and adjustment.

In testimony that we claim the foregoing as our own, we have hereto affixed our signatures in the presence of two witnesses.

FRANK O. SWENSON.
OSCAR E. HALLEN.

Witnesses:
  WINNIE FRYXELL,
  WM. A. MEESE.

---

Copies of this patent may be obtained for five cents each, by addressing the "Commissioner of Patents, Washington, D. C."